(12) United States Patent
Bai (10) Patent No.: US 12,296,912 B2
(45) Date of Patent: May 13, 2025

(54) HOVERBOARD

(71) Applicant: Foshan Shunde Mingsheng Hardware Plastic Technology Co., Ltd., FoShan (CN)

(72) Inventor: Shigang Bai, FoShan (CN)

(73) Assignee: Foshan Shunde Mingsheng Hardware Plastic Technology Co., Ltd., FoShan (CN)

( * ) Notice: Subject to any disclaimer, the term of this patent is extended or adjusted under 35 U.S.C. 154(b) by 368 days.

(21) Appl. No.: 18/077,850

(22) Filed: Dec. 8, 2022

(65) Prior Publication Data

US 2023/0107027 A1    Apr. 6, 2023

Related U.S. Application Data

(63) Continuation of application No. PCT/CN2020/112077, filed on Aug. 28, 2020.

(30) Foreign Application Priority Data

Jul. 17, 2020 (CN) .......................... 202010692637.7
Jul. 17, 2020 (CN) .......................... 202021414885.7

(51) Int. Cl.
*B62K 11/00* (2006.01)
(52) U.S. Cl.
CPC ................................. *B62K 11/007* (2016.11)
(58) Field of Classification Search
CPC .................................................. B62K 11/007
See application file for complete search history.

(56) References Cited

U.S. PATENT DOCUMENTS 10,167,037 B2 * 1/2019 Ying ...................... B62D 51/02
10,421,006 B1 * 9/2019 Li ........................ A63C 17/002
(Continued)

FOREIGN PATENT DOCUMENTS

CN    206679145 U  * 11/2017
CN    111891277 A  * 11/2020 ........... B62K 11/007

*Primary Examiner* — Kevin Hurley
(74) *Attorney, Agent, or Firm* — JEEN IP LAW, LLC (57) ABSTRACT

A hoverboard comprises a left supporting shaft, a right supporting shaft and wheels, wherein an outer end of the left supporting shaft and an outer end of the right supporting shaft are both connected to the wheels; an inner end of the left supporting shaft and an inner end of the right supporting shaft are relatively rotatably connected to each other; the inner end of the right supporting shaft is provided with a small outer-diameter portion which is adaptively inserted in the inner end of the left supporting shaft; a side wall of the inner end of the left supporting shaft is provided with an arc-shaped through hole; a lower end of a limiting bolt penetrates through the arc-shaped through hole to be fixedly connected to the small outer-diameter portion, and an upper end of the limiting bolt is at least higher than a lower edge of the arc-shaped through hole; and two inner side walls of the arc-shaped through hole in a lengthwise direction thereof define extreme positions of the relative rotation of the left supporting shaft and the right supporting shaft respectively. The hoverboard having a structure, capable of being assembled more conveniently, that the left supporting shaft and the right supporting shaft are relatively rotatably connected to each other is provided, and compared with similar products on the current market, the hoverboard has more space to reduce its own weight.

14 Claims, 10 Drawing Sheets

(56) References Cited

U.S. PATENT DOCUMENTS

| | | | | |
|---|---|---|---|---|
| 11,524,743 | B2* | 12/2022 | Ke | A63C 17/04 |
| 11,654,995 | B2* | 5/2023 | Desberg | B62M 7/12 |
| | | | | 180/6.5 |
| 12,077,238 | B2* | 9/2024 | Zang | B62J 45/42 |
| 2024/0343335 | A1* | 10/2024 | Chen | B62K 11/007 |

* cited by examiner

HOVERBOARD

FIELD OF TECHNOLOGY

The present disclosure relates to the technical field of hoverboards, in particular to a hoverboard.

BACKGROUND

A hoverboard is also called a sensor controlled vehicle or a segway. There are two main types, including a single-wheel type and a double-wheel type on the market. The operation principle of the hoverboard is mainly established on a fundamental principle called "dynamic stabilization", a gyroscope and an acceleration sensor inside a hoverboard body are used to detect changes of the attitude of the hoverboard body, and a servo control system is used to accurately drive an electric motor to carry out corresponding adjustments, so as to maintain the balance of a system.

In the prior art, aluminum plates will be arranged in a left cover and a right cover respectively, the two aluminum plates are relatively rotatably arranged so as to adjust the direction of the hoverboard, but the hoverboard is large in overall weight and inconvenient to move due to the two heavy aluminum plates, and a manufacturer has been unable to reduce the cost.

SUMMARY

The present disclosure mainly aims to provide a hoverboard having a structure, capable of being assembled more conveniently, that a left supporting shaft and a right supporting shaft are relatively rotatably connected to each other, and compared with similar products on the current market, the hoverboard has more space to reduce its own weight.

In order to achieve the purpose mentioned above, the present disclosure provides the hoverboard, comprising the left supporting shaft, the right supporting shaft and wheels, wherein an outer end of the left supporting shaft and an outer end of the right supporting shaft are both connected to the wheels; an inner end of the left supporting shaft and an inner end of the right supporting shaft are relatively rotatably connected to each other;

the inner end of the right supporting shaft is provided with a small outer-diameter portion which is adaptively inserted in the inner end of the left supporting shaft;

a side wall of the inner end of the left supporting shaft is provided with an arc-shaped through hole; a lower end of a limiting bolt penetrates through the arc-shaped through hole to be fixedly connected to the small outer-diameter portion, and an upper end of the limiting bolt is at least higher than a lower edge of the arc-shaped through hole; and two inner side walls of the arc-shaped through hole in a lengthwise direction thereof define extreme positions of the relative rotation of the left supporting shaft and the right supporting shaft respectively.

Preferably, the arc-shaped through hole has a width matching that of an upper end cap of the limiting bolt, so that the upper end cap of the limiting bolt makes contact with side walls of the arc-shaped through hole.

Preferably, the inner end of the left supporting shaft is provided with a mounting cylinder portion allowing the small outer-diameter portion to be inserted, and the mounting cylinder portion is provided with an inner wall surface perpendicular to the axis of the left supporting shaft, so as to define an extreme position of the small outer-diameter portion when the small outer-diameter portion is inserted into the left supporting shaft.

Preferably, the hoverboard further comprises a sleeve with two ends communicated with each other, wherein the sleeve is sleeved on the periphery of the small outer-diameter portion, and the sleeve and the small outer-diameter portion are coaxially mounted at the inner end of the left supporting shaft; and the sleeve is shorter than the small outer-diameter portion, and accordingly, the inner end of the left supporting shaft is provided with a large-diameter inner cylinder and a small-diameter inner cylinder which are sequentially distributed from left to right.

Preferably, the hoverboard further comprises a left cover and a right cover, wherein the left cover comprises an upper left cover and a lower left cover fitting the upper left cover, and a shaft lever of the left supporting shaft extends in a lengthwise direction of the left cover and is fixedly connected to the upper left cover; and the right cover comprises an upper right cover and a lower right cover fitting the upper right cover, and a shaft lever of the right supporting shaft extends in a lengthwise direction of the right cover and is fixedly connected to the upper right cover.

Preferably, the hoverboard further comprises a supporting sleeve, wherein the supporting sleeve comprises an inner supporting cylinder sleeved in a position where an inner end surface of the left supporting shaft and an inner end surface of the right supporting shaft converge; and an edge of the supporting sleeve is clamped in a position where a right end surface of the left cover and a left end surface of the right cover converge.

Preferably, an end surface of the supporting sleeve is provided with U-shaped clamping corners extending horizontally outwards, openings of the U-shaped clamping corners face outwards, the left cover and/or the right cover are/is provided with supporting columns extending in a vertical direction, and the supporting columns are clamped in the openings of the U-shaped clamping corners.

Preferably, mounting bases are respectively arranged in a supported manner between the shaft lever of the left supporting shaft and an inner end surface of the upper left cover and between the shaft lever of the right supporting shaft and an inner end surface of the upper right cover, and mounting bolts are respectively arranged to sequentially penetrate through the shaft lever of the left supporting shaft and the mounting base below and penetrate through the shaft lever of the right supporting shaft and the mounting base below to achieve fixed connection.

Preferably, recesses which are sunken downwards and suitable for clamping of the shaft lever of the left supporting shaft and the shaft lever of the right supporting shaft are provided in upper end surfaces of the mounting bases.

Preferably, the wheels comprise a left wheel and a right wheel, a wheel axle of the left wheel extending rightwards in a horizontal direction to form the left supporting shaft, and a wheel axle of the right wheel extending leftwards in a horizontal direction to form the right supporting shaft.

Preferably, the wheel axle of the left wheel is inserted in the outer end of the left supporting shaft, and a fixing bolt radially penetrates through the wheel axle and the left supporting shaft to fixedly connect the wheel axle to the left supporting shaft; and similarly, the wheel axle of the right wheel is inserted in the outer end of the right supporting shaft, and a fixing bolt radially penetrates through the wheel axle and the right supporting shaft to fixedly connect the wheel axle to the right supporting shaft.

Preferably, the wheel axles are fixedly connected to the left supporting shaft and/or the right supporting shaft by means of fixing assemblies;
  each fixing assembly comprises a mounting sheet, supporting bases and the fixing bolt, the mounting sheet comprising an arc-shaped portion and platform portions, and the two platform portions being respectively connected to two free ends of the arc-shaped portion;
  wire passing through holes are provided in a side wall of the outer end of the left supporting shaft and/or a side wall of the outer end of the right supporting shaft and are longer than shaft levers of the wheel axles that are inserted into the outer end of the left supporting shaft and/or the outer end of the right supporting shaft; and
  the arc-shaped portion is adaptively clamped on an outer side wall of the shaft lever of the left supporting shaft and/or an outer side wall of the shaft lever of the right supporting shaft, the fixing bolt sequentially penetrates through the arc-shaped portion, the wire passing through hole and the wheel axle to be fixedly connected to the wheel axle,
  the two platform portions are respectively located on two sides of the shaft lever of the left supporting shaft and/or two sides of the shaft lever of the right supporting shaft and are respectively carried by the two supporting bases, and the mounting bolts sequentially penetrate through the platform portions and the supporting bases to be fixedly connected to the supporting bases.

Preferably, the wheel axles are fixedly connected to the left supporting shaft and/or the right supporting shaft by means of fixing assemblies;
  each fixing assembly comprises a mounting sheet, supporting bases and the fixing bolt, the mounting sheet comprising an arc-shaped portion and platform portions, and the two platform portions being respectively connected to two free ends of the arc-shaped portion;
  fixing bolts sequentially penetrate through the side wall of the left supporting shaft and/or the side wall of the right supporting shaft and the wheel axles to be fixedly connected to the wheel axles;
  arc-shaped portions are adaptively clamped on an outer side wall of a shaft lever of the left supporting shaft and/or an outer side wall of a shaft lever of the right supporting shaft, two platform portions are respectively located on two sides of the shaft lever of the left supporting shaft and/or two sides of the shaft lever of the right supporting shaft and are respectively carried by two supporting bases, and mounting bolts sequentially penetrate through the platform portions and the supporting bases to be fixedly connected to the supporting bases;
  wire passing through holes are provided in a side wall of the outer end of the left supporting shaft and/or a side wall of the outer end of the right supporting shaft and are longer than shaft levers of the wheel axles that are inserted into the outer end of the left supporting shaft and/or the outer end of the right supporting shaft; and
  the wire passing through holes and the fixing bolts are located on two opposite sides of the supporting shaft levers.

Preferably, the hoverboard further comprises an infrared sensing assembly, wherein the infrared sensing assembly comprises pedal portions, arranged on the upper left cover and the upper right cover, and elastic components for supporting the pedal portions to reset, each pedal portion is provided with a fixing frame extending downwards, a sensing portion is connected to the fixing frame, an infrared sensing switch is arranged under the sensing portion, and the sensing portion can be inserted into the infrared sensing switch when the pedal portion is stressed to be pressed downwards; and when the pedal portion is reset upwards, the pedal portion is separated from the infrared sensing switch, and the infrared sensing switch is electrically connected to a control system of the hoverboard; and
  the hoverboard further comprises hub motors configured to drive the wheels and electrically connected to the control system.

Preferably, the hoverboard further comprises a power supply module for providing a power supply for the control system, wherein the power supply module is arranged in a battery box;
  the battery box is mounted on the upper left cover and/or the upper right cover; and the middle of the battery box is provided with a notch allowing the left supporting shaft and/or the right supporting shaft to penetrate through.

The technical solution provides the structure of the hoverboard that the left supporting shaft and the right supporting shaft are relatively rotatably connected to each other, that is, the arc-shaped through hole is directly formed in the side wall of the left supporting shaft and extends in an arc shape in the relative rotation direction of the left supporting shaft and the right supporting shaft, the small outer-diameter portion of the right supporting shaft is inserted into the inner end of the left supporting shaft, the forwards extending distance during inserting exceeds the position where the arc-shaped through hole is located, then the limiting bolt penetrates through the arc-shaped through hole from the outside to be fixedly connected to the small outer-diameter portion, the movable range of the upper end of the limiting bolt is limited by the arc-shaped through hole, and when the left supporting shaft and the right supporting shaft rotates relatively, the limiting bolt reciprocates in the arc-shaped through hole in the lengthwise direction of the arc-shaped through hole.

BRIEF DESCRIPTION OF THE DRAWINGS

In order to explain embodiments of the present disclosure or technical solutions in the prior art more clearly, drawings needed in descriptions of the embodiments or the prior art will be briefly introduced below. Obviously, the accompanying drawings in the following descriptions are only some embodiments of the present disclosure, and for a person of ordinary skill in the art, other drawings can be obtained according to structures shown in these accompanying drawings without involving any inventive effort.

DESCRIPTION OF REFERENCE NUMERALS left supporting shaft 11, right supporting shaft 12, small outer-diameter portion 13, arc-shaped through hole 14, mounting cylinder portion 15, large-diameter inner cylinder 151, small-diameter inner cylinder 152, limiting bolt 16, mounting base 17, mounting bolt 18, fixing assembly 19, mounting sheet 191, arc-shaped portion 1911, platform portion 1912, and wire passing through hole 192;
wheel 2, left wheel 21, and right wheel 22;
sleeve 3, left cover 4, upper left cover 41, lower left cover 42, right cover 5, upper right cover 51, and lower right cover 52;
supporting sleeve 6, inner supporting cylinder 61, and U-shaped clamping corner 62;
supporting column 7, and fixing bolt 8;
infrared sensing assembly 9, pedal portion 91, fixing frame 92, and sensing portion 93; and
battery box 10, and notch 101.

The achievement of the purpose, functional characteristics and advantages of the present disclosure will be further explained with reference to the accompanying drawings in conjunction with the embodiments.

DESCRIPTION OF THE EMBODIMENTS

The technical solutions in embodiments of the present disclosure will be described clearly and completely below in conjunction with the accompanying drawings in the embodiments of the present disclosure. Obviously, the described embodiments are only a part of embodiments of the present disclosure, not all of them. On the basis of the embodiments of the present disclosure, all other embodiments obtained by a person of ordinary skill in the art without involving any inventive effort should fall within the scope of protection of the present disclosure.

It should be noted that if the embodiments of the present disclosure involve directional indications (such as up, down, left, right, front, back, etc.), the directional indications are only used to explain the relative position relationship and motions of components in a specific attitude (as shown in the accompanying drawings), and if the specific attitude is changed, the directional indications will be changed accordingly.

In addition, if the embodiments of the present disclosure include descriptions involving "first", "second" and the like, the descriptions involving "first", "second" and the like are only for description purposes, and cannot be understood as indicating or implying the relative importance or implicitly indicating the number of indicated technical features. Thus, the features defined as "first" and "second" can explicitly or implicitly include at least one such feature. Besides, the technical solutions of the embodiments can be combined with one another on the basis that such combinations can be implemented by a person of ordinary skill in the art, and when the combinations of the technical solutions are contradictory or cannot be implemented, it should be considered that such combinations of the technical solutions do not exist and do not fall within the scope of protection claimed by the present disclosure.

The solutions of the present disclosure are further described below in conjunction with FIGS. 1-12 and the related embodiments.

As shown in FIGS. 1-5, a hoverboard comprises a left supporting shaft 11, a right supporting shaft 12 and wheels 2, wherein an outer end of the left supporting shaft 11 and an outer end of the right supporting shaft 12 are both connected to the wheels 2; an inner end of the left supporting shaft 11 and an inner end of the right supporting shaft 12 are relatively rotatably connected to each other;

the inner end of the right supporting shaft 12 is provided with a small outer-diameter portion 13 which is adaptively inserted in the inner end of the left supporting shaft 11;

a side wall of the inner end of the left supporting shaft 11 is provided with an arc-shaped through hole 14; a lower end of a limiting bolt 16 penetrates through the arc-shaped through hole 14 to be fixedly connected to the small outer-diameter portion 13, and an upper end of the limiting bolt is at least higher than a lower edge of the arc-shaped through hole 14; and two inner side walls of the arc-shaped through hole 14 in a lengthwise direction thereof define extreme positions of the relative rotation of the left supporting shaft 11 and the right supporting shaft 12 respectively.

The technical solution provides the structure of the hoverboard that the left supporting shaft 11 and the right supporting shaft 12 are relatively rotatably connected to each other, that is, the arc-shaped through hole 14 is directly formed in the side wall of the left supporting shaft 11 and extends in an arc shape in the relative rotation direction of the left supporting shaft 11 and the right supporting shaft 12, the small outer-diameter portion 13 of the right supporting shaft 12 is inserted into the inner end of the left supporting shaft 11, the forwards extending distance during inserting exceeds the position where the arc-shaped through hole 14 is located, then the limiting bolt 16 penetrates through the arc-shaped through hole 14 from the outside to be fixedly connected to the small outer-diameter portion 13, the movable range of the upper end of the limiting bolt 16 is limited by the arc-shaped through hole 14, and when the left supporting shaft 11 and the right supporting shaft 12 rotates relatively, the limiting bolt 16 reciprocates in the arc-shaped through hole 14 in the lengthwise direction of the arc-shaped through hole.

Figure 3:
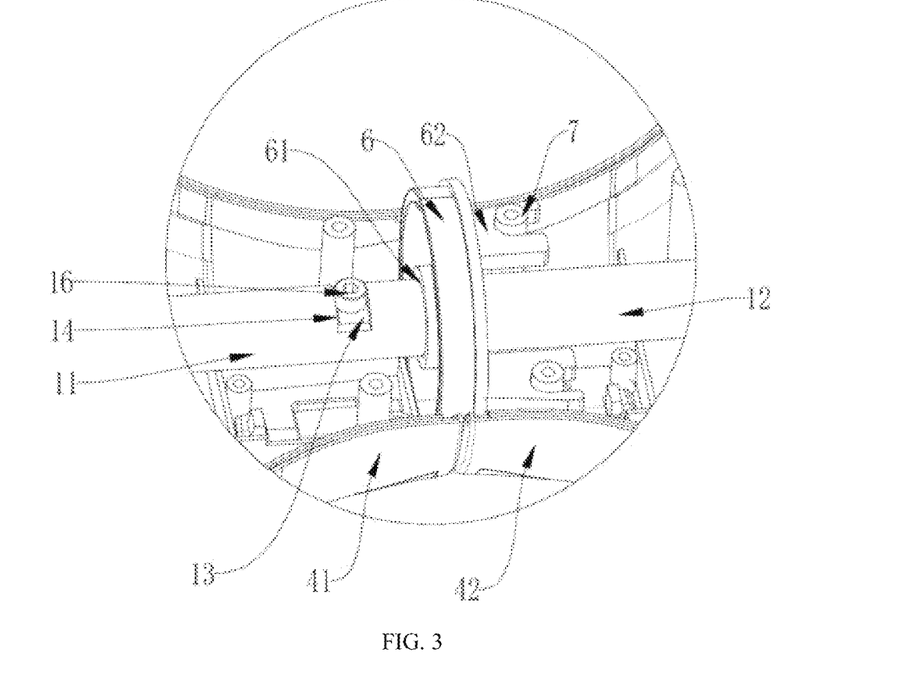
FIG. 3 is a partial enlarged view of part B in FIG. 2.
Figure 5:
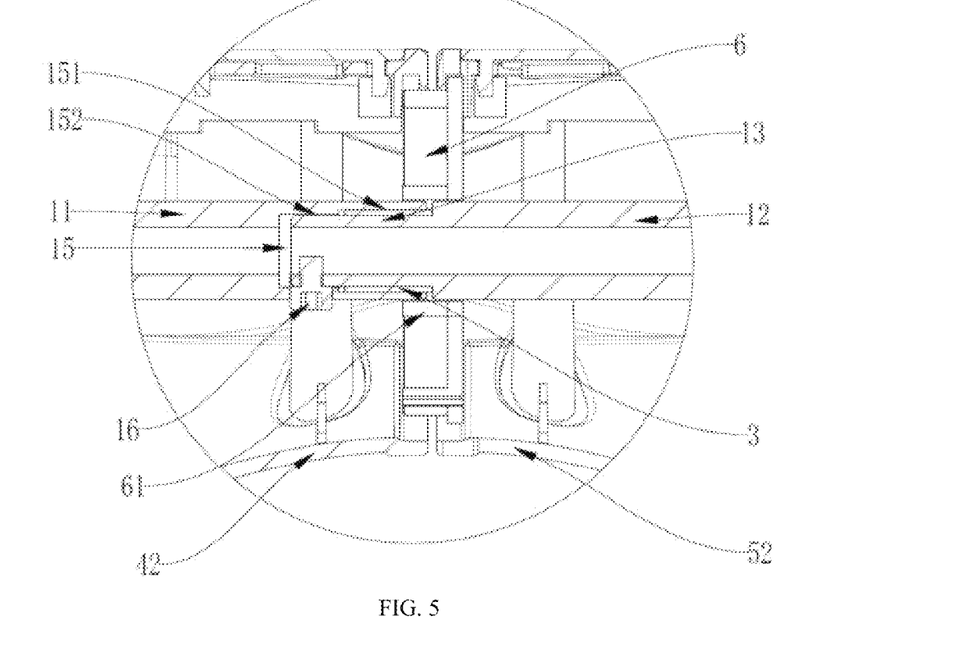
FIG. 5 is a partial enlarged view of part A in FIG. 4.

The assembling manner of the limiting bolt 16 and the arc-shaped through hole 14 should be noted, the upper end cap of the limiting bolt 16 can be higher than an outer wall surface of the arc-shaped through hole 14, or be lower than the outer wall surface of the arc-shaped through hole 14 and sink into a hole wall of the arc-shaped through hole 14, and all that is needed is that an upper end surface of the upper end cap of the limiting bolt 16 is higher than a lower edge of the hole wall of the arc-shaped through hole 14 such that the hole wall of the arc-shaped through hole 14 can limit the extreme position of the movement of the limiting bolt 16. For the width of the upper end cap of the limiting bolt 16 and the width of the arc-shaped through hole 14, the best size fit is that the width of the upper cap end is slightly less than the width of the arc shaped through hole 14. During assembly, a side wall of the upper end cap of the limiting bolt 16 makes slight contact with the hole wall of the arc-shaped through hole 14, on one hand, the relative movement of the left supporting shaft 11 and the right supporting shaft 12 in an axial direction is limited, and on the other hand, the friction force during the relative rotation of the left supporting shaft 11 and the right supporting shaft 12 is also increased, which facilitates control of the direction adjustment of the hoverboard.

Preferably, the inner end of the left supporting shaft 11 is provided with a mounting cylinder portion 15 allowing the small outer-diameter portion 13 to be inserted, and the mounting cylinder portion 15 is provided with an inner wall surface perpendicular to the axis of the left supporting shaft 11, so as to define an extreme position of the small outer-diameter portion 13 when the small outer-diameter portion is inserted into the left supporting shaft 11.

In this embodiment, the left supporting shaft 11 may be a shaft provided with a central through hole with two ends communicated with each other, and the mounting cylinder portion 15 is arranged at the front end of the left supporting shaft 11 and has an inner diameter larger than that of the central through hole, so that the mounting cylinder portion 15 and the central through hole form a stepped end surface at the variable-diameter transition position, and the stepped end surface is the inner wall surface perpendicular to the axis of the left supporting shaft 11 and is used to define the extreme position of the small outer-diameter portion 13 when the small outer-diameter portion is inserted into the left supporting shaft 11. In addition, the left supporting shaft 11 may be a solid shaft, and the mounting cylinder portion 15 is arranged at the front end of the left supporting shaft 11, so that a bottom wall surface of the mounting cylinder portion 15 is the inner wall surface perpendicular to the axis of the left supporting shaft 11 and is used to define the extreme position of the small outer-diameter portion 13 when the small outer-diameter portion is inserted into the left supporting shaft 11, so as to improve the assembling stability.

Preferably, the hoverboard further comprises a sleeve 3 with two ends communicated with each other, wherein the sleeve is sleeved on the periphery of the small outer-diameter portion 13, and the sleeve and the small outer-diameter portion 13 are coaxially mounted at the inner end of the left supporting shaft 11; and
the sleeve 3 is shorter than the small outer-diameter portion 13, and accordingly, the inner end of the left supporting shaft 11 is provided with a large-diameter inner cylinder 151 and a small-diameter inner cylinder 152 which are sequentially distributed from left to right.

In this embodiment, the sleeve 3 is additionally arranged between an outer wall surface of the small outer-diameter portion 13 and an inner wall surface of the left supporting shaft 11, so as to improve the strength and the flexibility of the connection position of the left supporting shaft 11 and the right supporting shaft 12.

Figure 4:
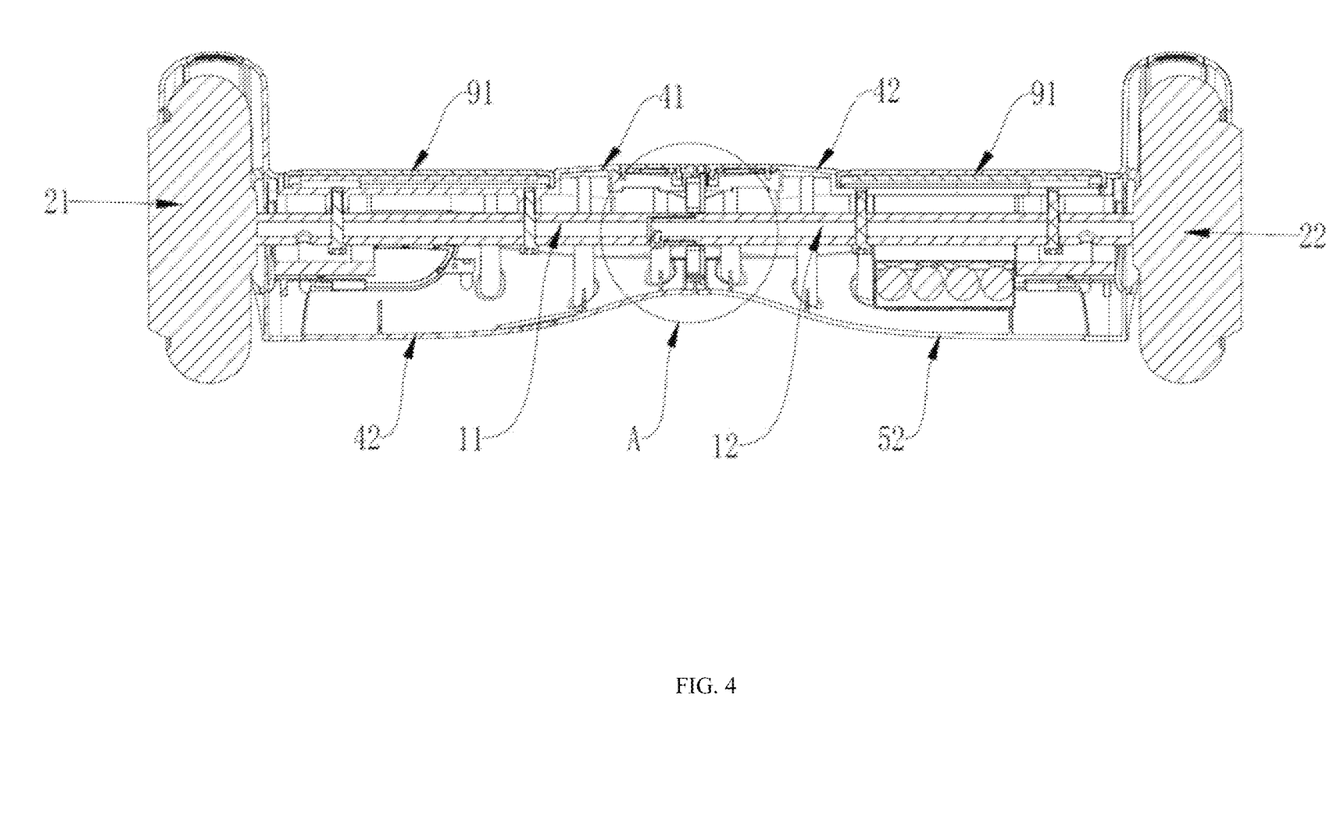
FIG. 4 is a section view of an embodiment of the hoverboard of the present disclosure.
Figure 6:
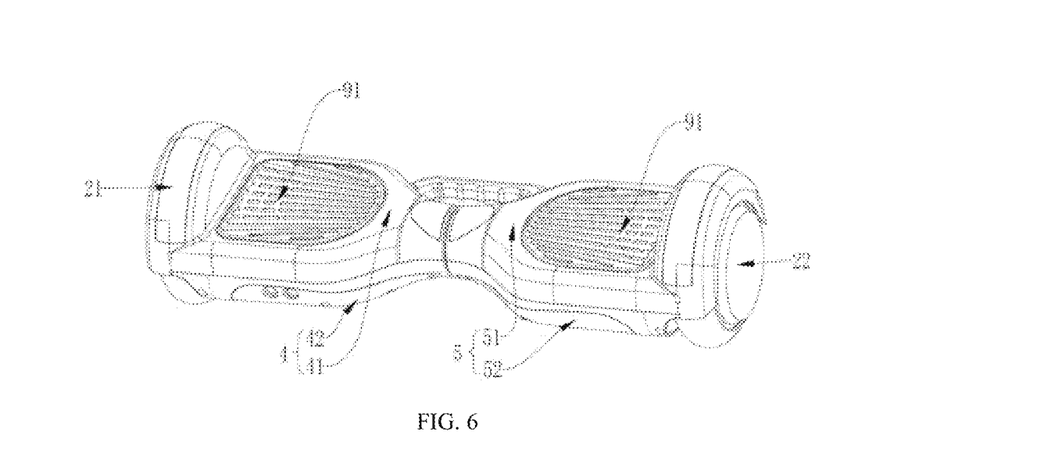
FIG. 6 is a schematic diagram of an external structure of an embodiment of the hoverboard of the present disclosure.

The hoverboard provided in this embodiment further comprises a left cover 4 and a right cover 5, wherein as shown in FIG. 4 and FIG. 6,
the left cover 4 comprises an upper left cover 41 and a lower left cover 42 fitting the upper left cover 41, and a shaft lever of the left supporting shaft 11 extends in a lengthwise direction of the left cover 4 and is fixedly connected to the upper left cover 41; and the right cover 5 comprises an upper right cover 51 and a lower right cover 52 fitting the upper right cover 51, and a shaft lever of the right supporting shaft 12 extends in a lengthwise direction of the right cover 5 and is fixedly connected to the upper right cover 51.

In the prior art, in order to enhance the strength of the hoverboard, aluminum plates will be arranged in the left cover 4 and the right cover 5 respectively, and the two aluminum plates are relatively rotatably arranged so as to adjust the direction of the hoverboard.

In this embodiment, the heavy and expensive aluminum plates are abandoned directly, the left supporting shaft 11 and the right supporting shaft 12 are directly and relatively rotatably connected to each other, then the left supporting shaft 11 and the right supporting shaft 12 are fixed to the upper left cover 41 and the upper right cover 51 respectively, so as to adjust the direction of the hoverboard, and thus the cost and the overall weight of the hoverboard are greatly reduced while the strength is guaranteed.

Preferably, as shown in FIG. 4 and FIG. 5, the hoverboard further comprises a supporting sleeve 6, wherein the supporting sleeve comprises an inner supporting cylinder 61 sleeved in a position where an inner end surface of the left supporting shaft 11 and an inner end surface of the right supporting shaft 12 converge; and
an edge of the supporting sleeve 6 is clamped in a position where a right end surface of the left cover 4 and a left end surface of the right cover 5 converge.

In order to further improve the assembling strength and tightness, the supporting sleeve 6 is arranged in this embodiment, end surfaces abut against each other when the inner end of the left supporting shaft 11 is rotatably connected to the right supporting shaft 12, and the inner supporting cylinder 61 is sleeved outside the position where the end surfaces abut against each other, which limits the radial loosening of the left supporting shaft and the right supporting shaft and realizes the stable assembling. Moreover, the edge of the supporting sleeve 6 is clamped in the position where the right end surface of the left cover 4 and the left end surface of the right cover 5 converge, preferably, the supporting sleeve 6 is cylindrical, a right end side of the left cover 4 is provided with a half groove, a left side of the right cover 5 is provided with a half groove, a right end surface of the left cover 4 and a left end surface of the right cover 5 abut against each other when the hoverboard is assembled, the two half grooves are combined into a complete clamping groove with an inward opening, the edge of the supporting sleeve 6 is clamped in the clamping groove in an abutting manner, and the clamping groove is formed along an edge track of the supporting sleeve 6. In this embodiment, the middle of the supporting sleeve 6 is tightly sleeved at the connection position of the left supporting shaft 11 and the right supporting shaft 12, and the edge abuts against and is tightly clamped in the left cover 4 and the right cover 5, so that the multiple purposes are achieved, and the tightness and the stability of the whole hoverboard structure are improved.

Further, an end surface of the supporting sleeve 6 is provided with U-shaped clamping corners 62 extending horizontally outwards, openings of the U-shaped clamping corners 62 face outwards, the left cover 4 and/or the right cover 5 are/is provided with supporting columns 7 extending in a vertical direction, and the supporting columns 7 are clamped in the openings of the U-shaped clamping corners 62.

In this embodiment, the supporting columns 7 extending in the vertical direction are clamped with the U-shaped clamping corners 62 of the supporting sleeve 6, which limits the horizontal deviation of the supporting sleeve 6 along the side of the opening direction of the U-shaped clamping corners and improves the stability of an internal structure of the hoverboard. Preferably, the two U-shaped clamping corners 62 are provided and are arranged on the end surface of the supporting sleeve 6 in parallel.

Preferably, in order to improve the connection stability of the supporting shafts and the covers, in this embodiment, mounting bases 17 are respectively arranged in a supported manner between the shaft lever of the left supporting shaft 11 and an inner end surface of the upper left cover 42 and between the shaft lever of the right supporting shaft 12 and an inner end surface of the upper right cover 51, and mounting bolts 18 are respectively arranged to sequentially penetrate through the shaft lever of the left supporting shaft 11 and the mounting base 17 below and penetrate through the shaft lever of the right supporting shaft 12 and the mounting base 17 below to achieve fixed connection; and preferably, recesses which are sunken downwards and suitable for clamping of the shaft lever of the left supporting shaft 11 and the shaft lever of the right supporting shaft 12 are provided in upper end surfaces of the mounting bases 17.

Figure 7:
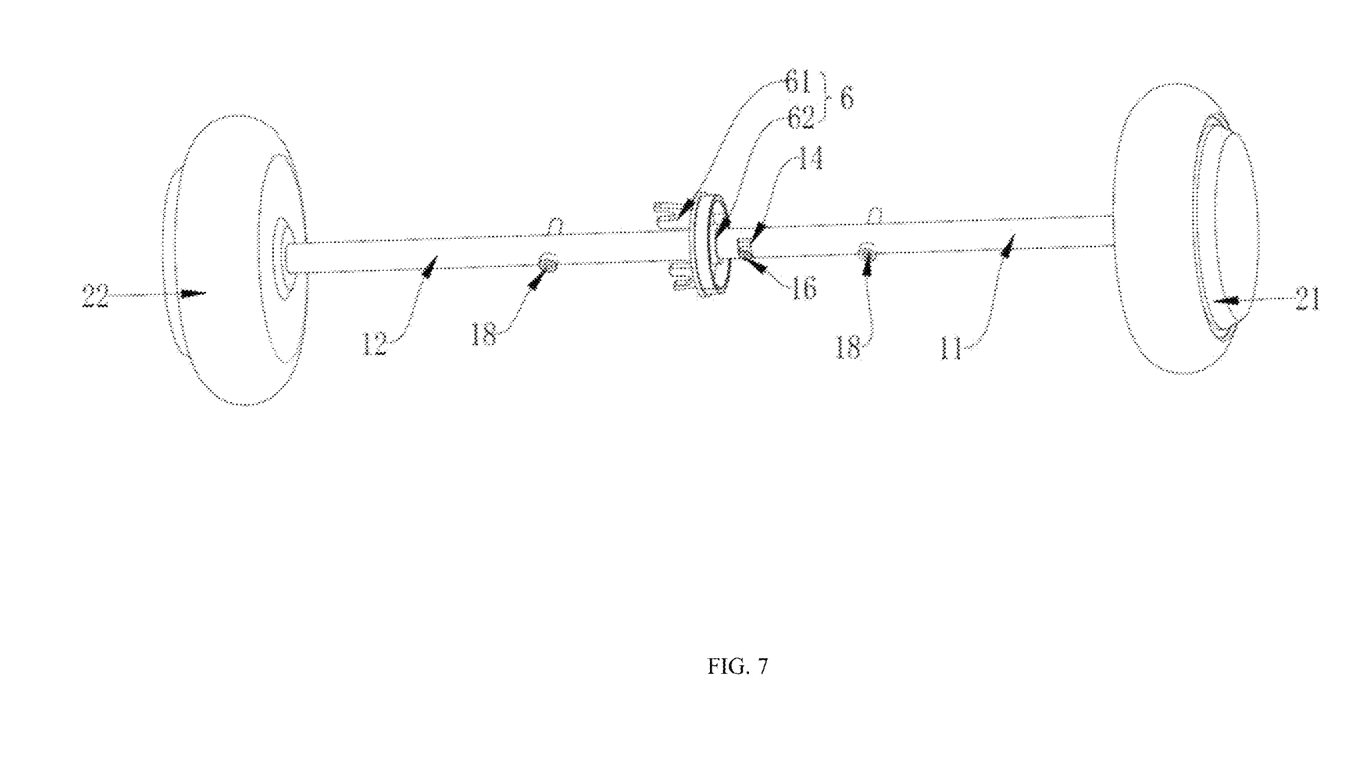
FIG. 7 is a schematic diagram of an (integrated) mounting structure of an embodiment of wheels and supporting shafts of the present disclosure.

There are many manners to achieve the specific mounting structure of the left supporting shaft 11 (right supporting shaft 12) and the wheel of the hoverboard. One preferred embodiment is that the wheel axle of the wheel and the supporting shaft are integrated into one shaft, and thus when the supporting shaft rotates, the wheel directly rotates along with the supporting shaft. Specifically, as shown in FIG. 4 and FIG. 7, the wheels 2 comprise a left wheel 21 and a right wheel 22, the wheel axle of the left wheel 21 extends rightwards in a horizontal direction to form the left supporting shaft 11, the wheel axle of the right wheel 22 extends leftwards in a horizontal direction to form the right supporting shaft 12, thus the structure is simple, and the mounting manner is simplified.

Figure 8:
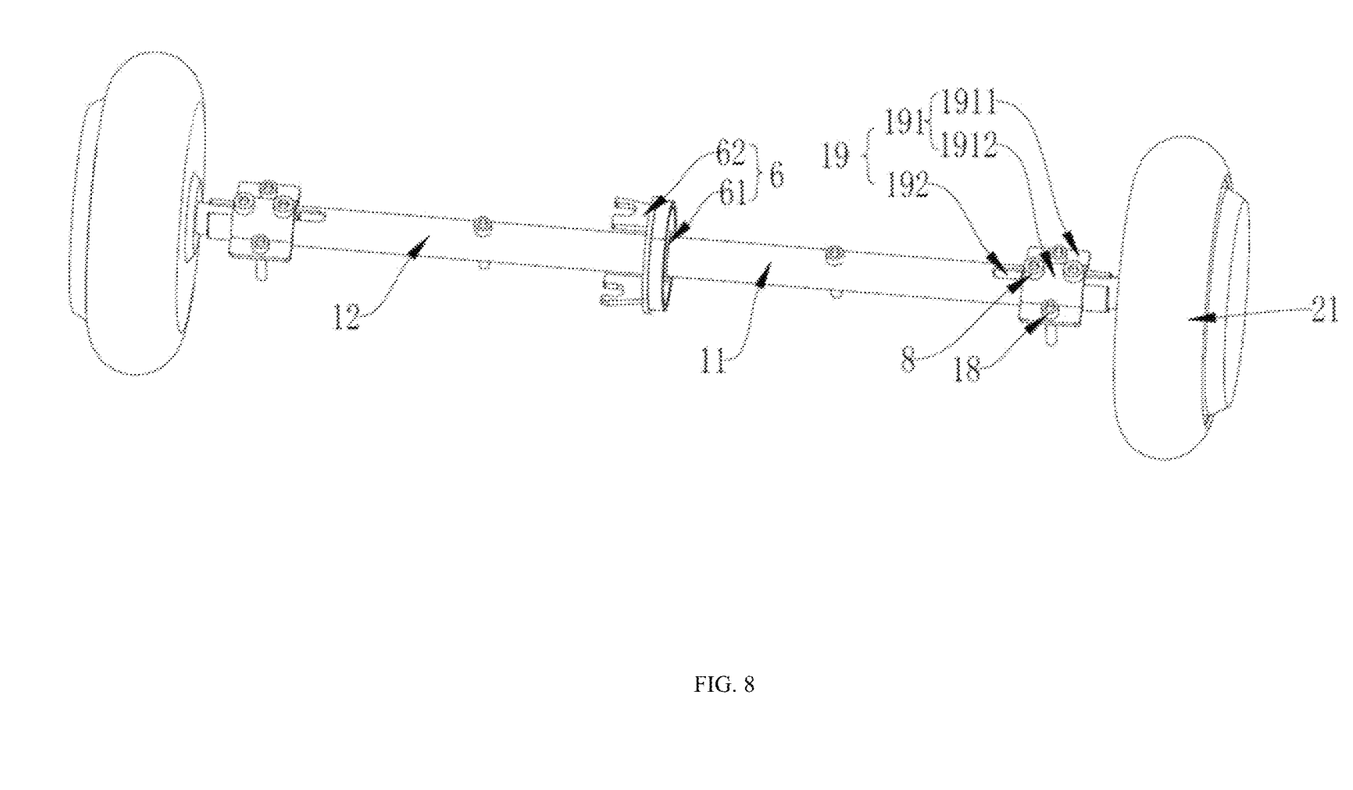
FIG. 8 is a schematic diagram of a (bolted type) mounting structure of an embodiment of the wheels and the supporting shafts of the present disclosure.

Another preferred embodiment is that the wheel axle of the wheel and the supporting shaft are assembled in an inserted manner by means of large-diameter and small-diameter shafts and then are in transmission connection by means of bolt fixing, and thus when the supporting shaft rotates, the wheel in transmission connection with the supporting shaft also rotates along with the supporting shaft. As shown in FIG. 8, specifically, the wheel axle of the left wheel 21 is inserted in the outer end of the left supporting shaft 11, and a fixing bolt 8 radially penetrates through the wheel axle and the left supporting shaft 11 to fixedly connect the wheel axle to the left supporting shaft; and similarly, the wheel axle of the right wheel 22 is inserted in the outer end of the right supporting shaft 12, and a fixing bolt 8 radially penetrates through the wheel axle and the right supporting shaft 12 to fixedly connect the wheel axle to the right supporting shaft.

Further, as shown in FIG. 8, the wheel axles are fixedly connected to the left supporting shaft 11 and/or the right supporting shaft 12 by means of fixing assemblies 19;

each fixing assembly 19 comprises a mounting sheet 191, supporting bases (not shown in the figure) and the fixing bolt 8, the mounting sheet comprising an arc-shaped portion 1911 and platform portions 1912, and the two platform portions 1912 being respectively connected to two free ends of the arc-shaped portion 1911;

wire passing through holes 192 are provided in a side wall of the outer end of the left supporting shaft 11 and/or a side wall of the outer end of the right supporting shaft 12 and are longer than shaft levers of the wheel axles that are inserted into the outer end of the left supporting shaft 11 and/or the outer end of the right supporting shaft 12, and gaps allowing mounting wires to penetrate through are reserved after the wire passing through holes and the wheel axles are overlaid; and the arc-shaped portion 1911 is adaptively clamped on an outer side wall of the shaft lever of the left supporting shaft 11 and/or an outer side wall of the shaft lever of the right supporting shaft 12, the fixing bolt 8 sequentially penetrates through the arc-shaped portion 1911, the wire passing through hole 192 and the wheel axle to be fixedly connected to the wheel axle, the two platform portions 1912 are respectively located on two sides of the shaft lever of the left supporting shaft 11 and/or two sides of the shaft lever of the right supporting shaft 12 and are respectively carried by the two supporting bases (not shown in the figure), the mounting bolts 18 sequentially penetrate through the platform portions 1912 and the supporting bases (not shown in the figure) to be fixedly connected to the supporting bases (not shown in the figure), and the friction force generated during overlaying of the multiple components are directly used to further ensure the connection stability between the wheel axles and the left supporting shaft 11 and/or the right supporting shaft 12.

Figure 9:
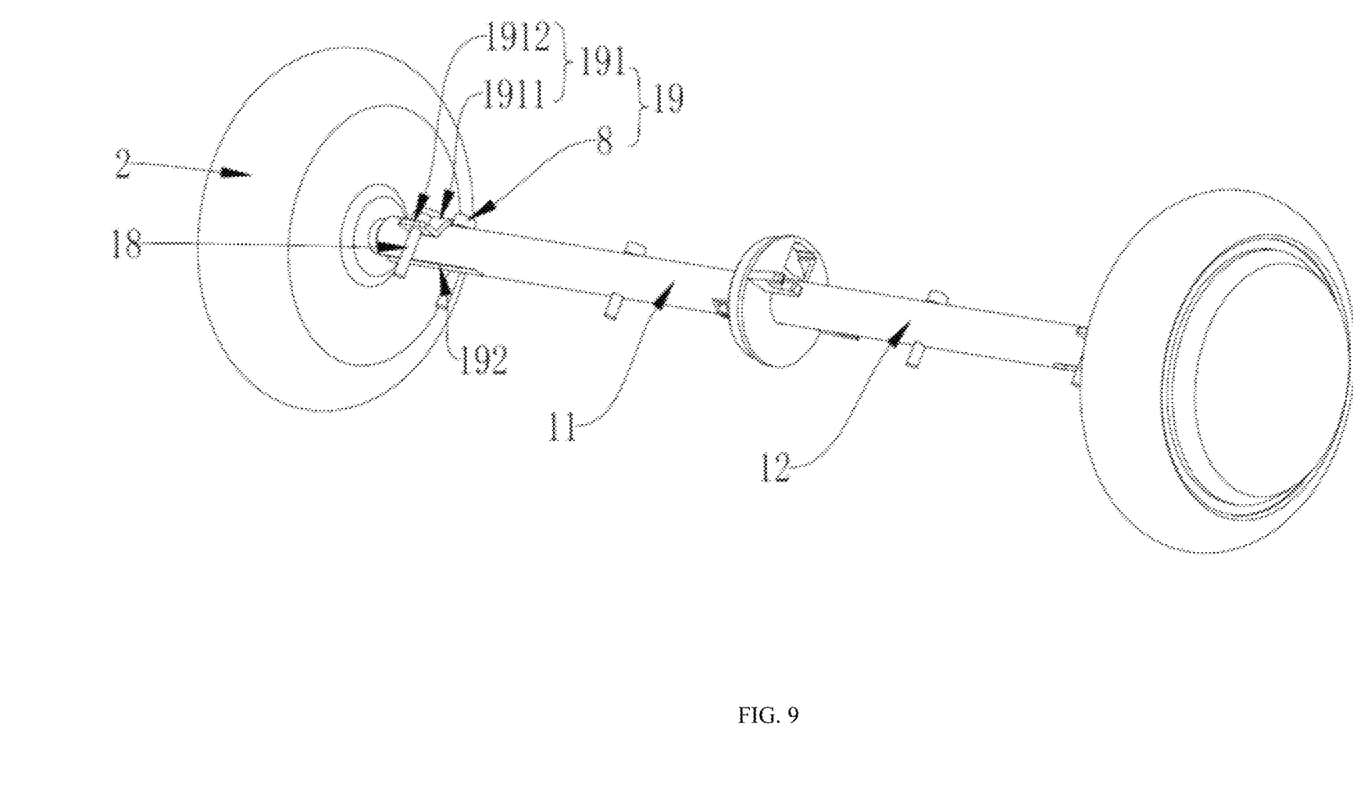
FIG. 9 is a schematic diagram (bottom view side) of a (bolted type) mounting structure of another embodiment of the wheels and the supporting shafts of the present disclosure.
Figure 10:
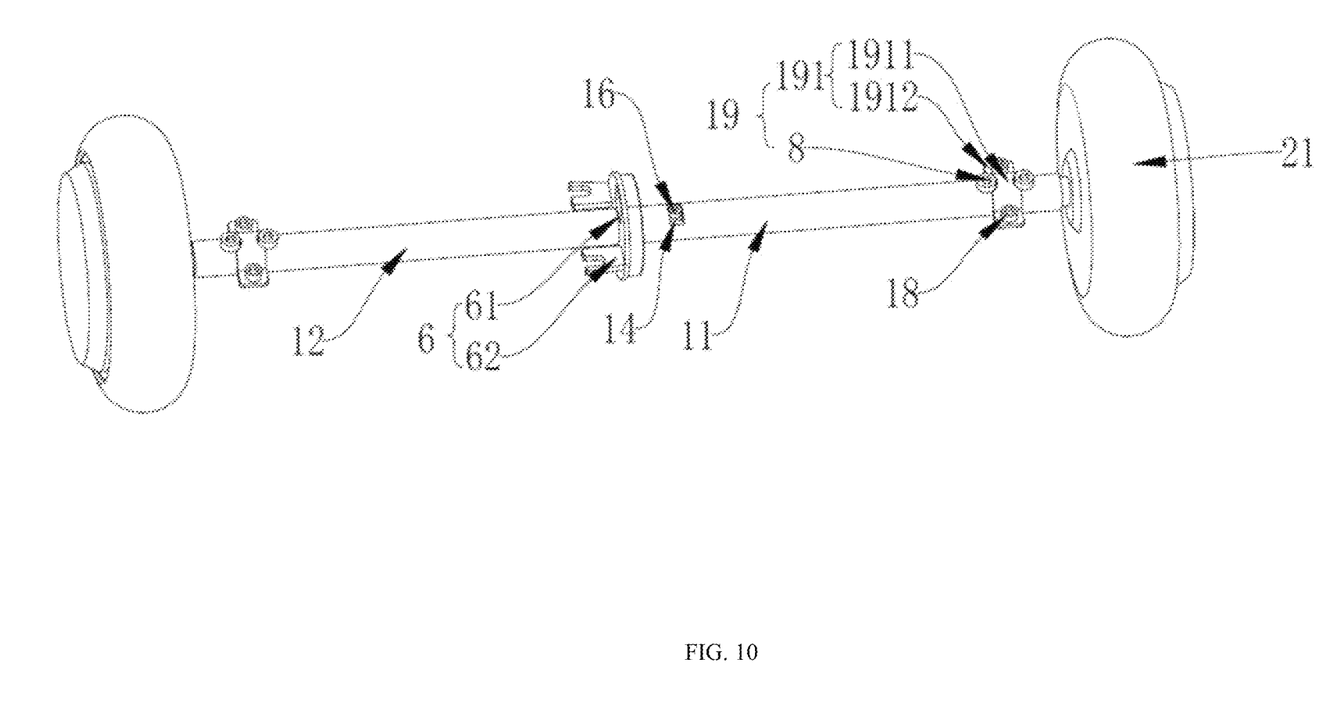
FIG. 10 is a schematic diagram (top view side) of the (bolted type) mounting structure of another embodiment of the wheels and the supporting shafts of the present disclosure.

Further, as shown in FIG. 9 and FIG. 10, the wheel axles are fixedly connected to the left supporting shaft 11 and/or the right supporting shaft 12 by means of fixing assemblies 19;

each fixing assembly 19 comprises a mounting sheet 191, supporting bases (not shown in the figure) and the fixing bolt 8, the mounting sheet comprising an arc-shaped portion 1911 and platform portions 1912, and the two platform portions 1912 being respectively connected to two free ends of the arc-shaped portion 1911;

the fixing bolts 8 sequentially penetrate through the side wall of the left supporting shaft 11 and/or the side wall of the right supporting shaft 12 and the wheel axles to be fixedly connected to the wheel axles;

the arc-shaped portions 1911 are adaptively clamped on an outer side wall of the shaft lever of the left supporting shaft 11 and/or an outer side wall of the shaft lever of the right supporting shaft 12, the two platform portions 1912 are respectively located on two sides of the shaft lever of the left supporting shaft 11 and/or two sides of the shaft lever of the right supporting shaft 12 and are respectively carried by two supporting bases (not shown in the figure), and mounting bolts 18 sequentially penetrate through the platform portions 1912 and the supporting bases (not shown in the figure) to be fixedly connected to the supporting bases (not shown in the figure); and wire passing through holes 192 are provided in a side wall of the outer end of the left supporting shaft 11 and/or a side wall of the outer end of the right supporting shaft 12, the wire passing through holes 192 and the fixing bolts 8 are located on two opposite sides of the supporting shaft levers, and the wire passing through holes 192 allow mounting wires to penetrate through, which is complementary to the mounting and fixing of the fixing bolts 8, so as to facilitate mounting.

Figure 11:
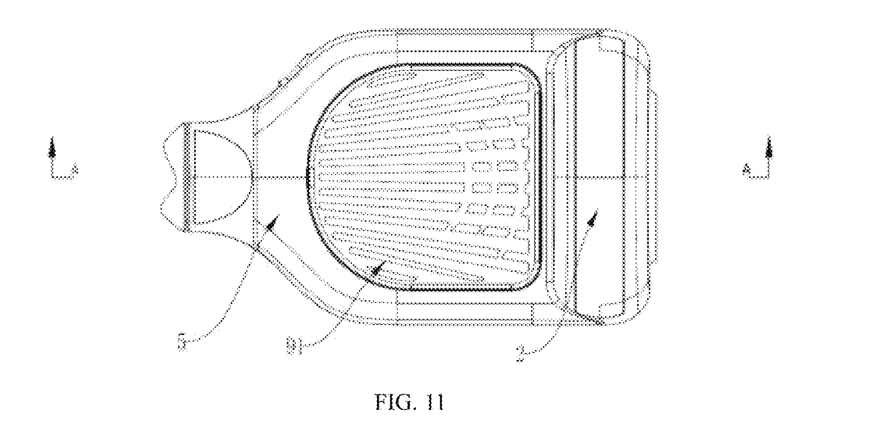
FIG. 11 is a top view of a right-side portion of an embodiment of the hoverboard of the present disclosure.
Figure 12:
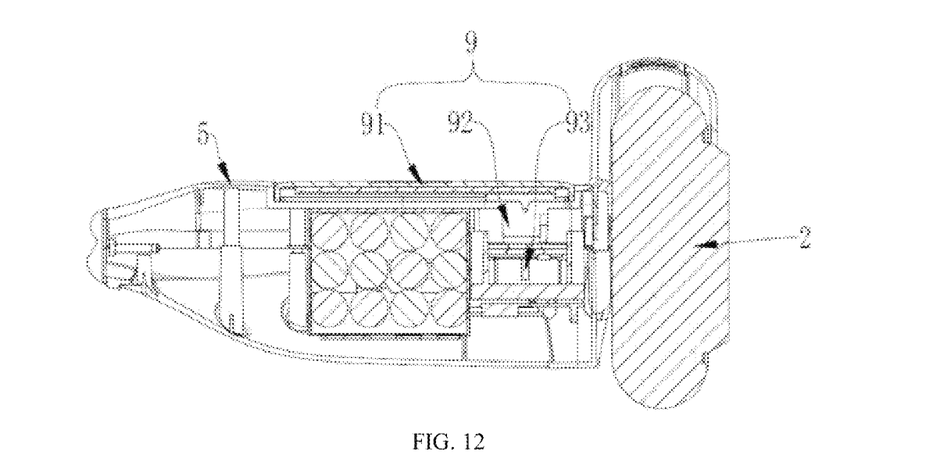
FIG. 12 is a section view in the direction A-A in FIG. 11.

Preferably, the hoverboard further comprises an infrared sensing assembly 9, wherein as shown in FIG. 11 and FIG.

12, the infrared sensing assembly 9 comprises pedal portions 91, arranged on the upper left cover 41 and the upper right cover 51, and elastic components for supporting the pedal portions 91 to reset, each pedal portion 91 is provided with a fixing frame 92 extending downwards, a sensing portion 93 is connected to the fixing frame 92, an infrared sensing switch is arranged under the sensing portion 93, and the sensing portion 93 can be inserted into the infrared sensing switch when the pedal portion 91 is stressed to be pressed downwards; and when the pedal portion 91 is reset upwards, the pedal portion 91 is separated from the infrared sensing switch, and the infrared sensing switch is electrically connected to a control system of the hoverboard; and the hoverboard further comprises hub motors configured to drive the wheels 2 and electrically connected to the control system.

The pedal portions 91 are provided with the fixing frames 92 extending downwards, the sensing portions 93 are connected to the fixing frames 92, and arranging the sensing portions 93 on the fixing frames 92 of the pedal portions 91 can reduce the direct vibration transmission of the lower left cover 12 and the lower right cover 22 on the sensing portions 93 and also facilitate the control on the sensing portions 93 by a user. When the user stands on the hoverboard, the pedal portions 91 may extrude the elastic components (not shown in the figures) downwards and directly drive the sensing portions 93 to move downwards to be inserted into the infrared sensing switches, so as to detect that the user stands on the hoverboard; and after the user gets off the hoverboard, the pedal portions 91 are reset by the elastic components, so that the sensing portions 93 are reset to detect that no one stands on the hoverboard.

Figure 1:
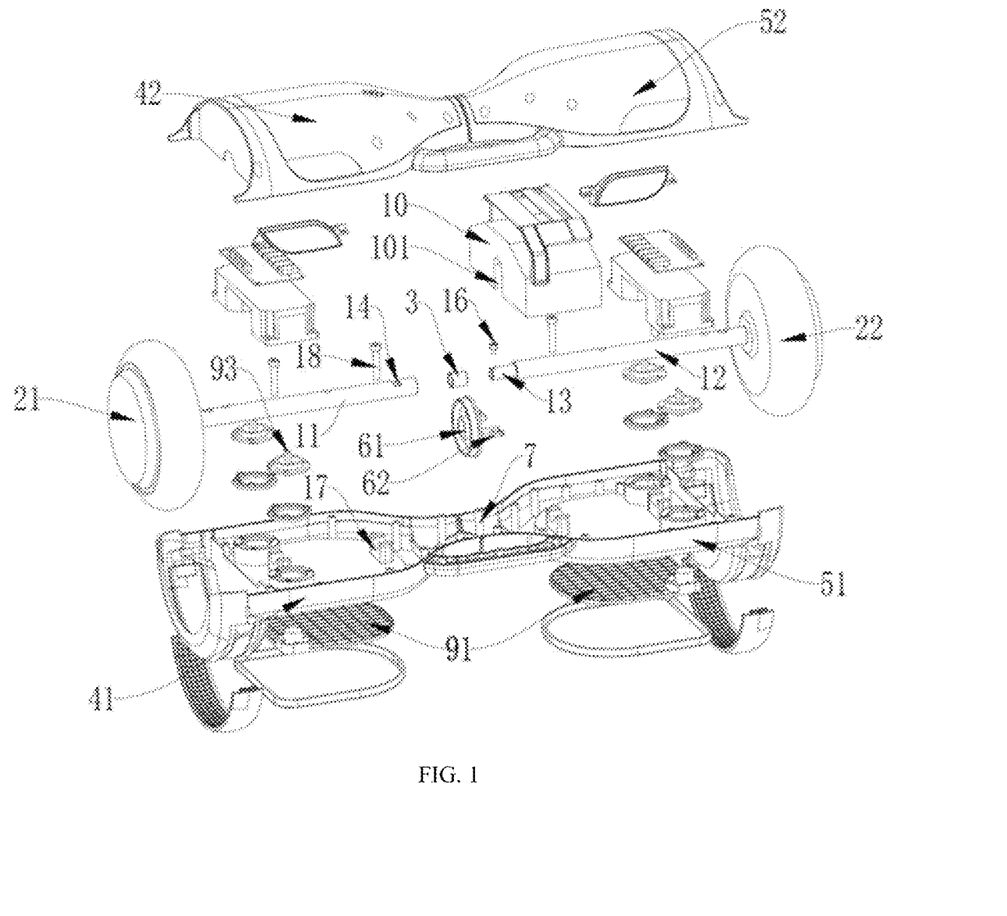
FIG. 1 is an exploded view of an embodiment of a hoverboard of the present disclosure.
Figure 2:
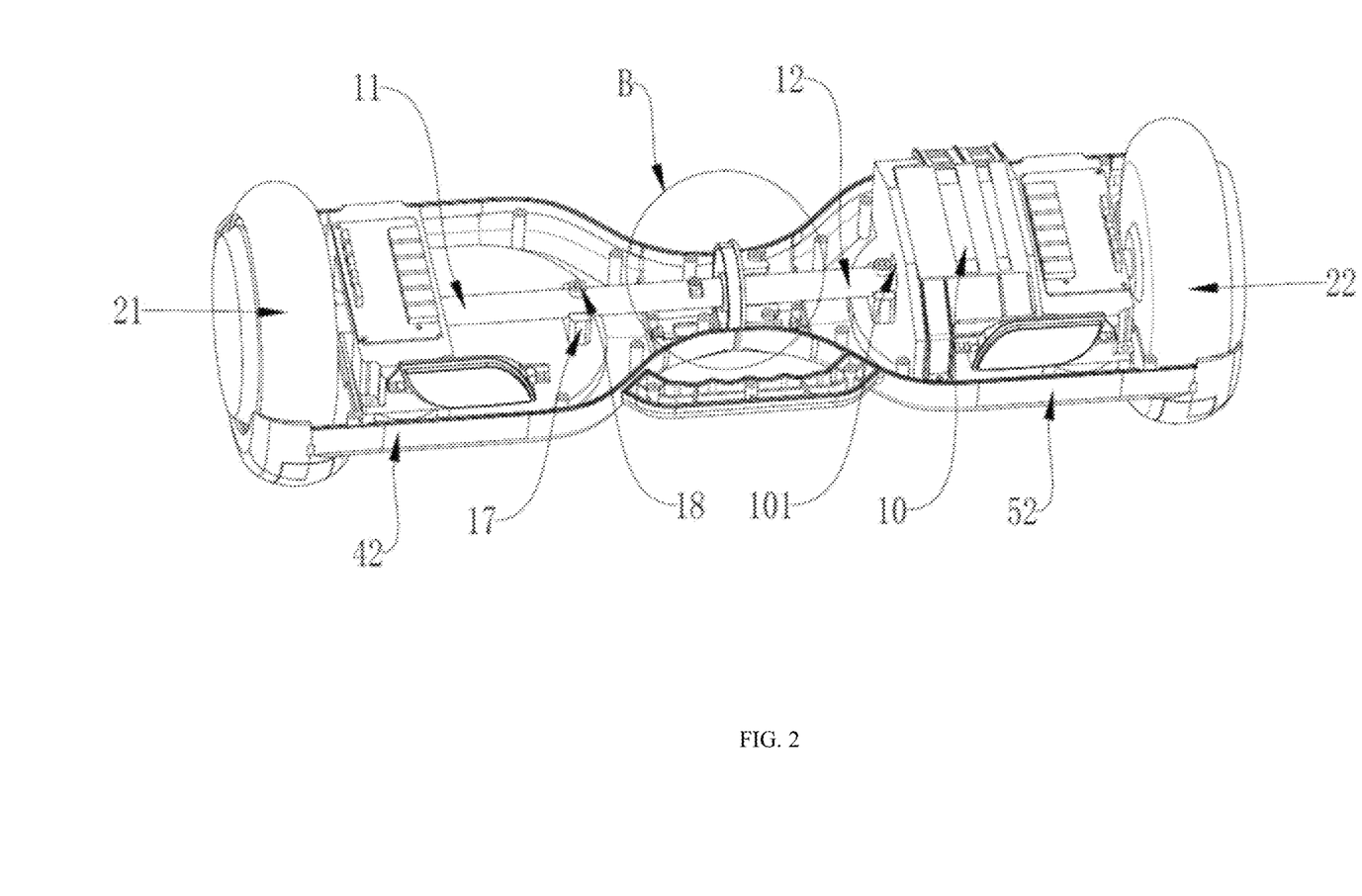
FIG. 2 is a schematic diagram of an internal structure of an embodiment of the hoverboard of the present disclosure.

Preferably, the hoverboard further comprises a power supply module for providing a power supply for the control system, wherein the power supply module is arranged in a battery box 10;

as shown in FIG. 2, the battery box 10 is mounted on the upper left cover 41 and/or the upper right cover 51; and the middle of the battery box 10 is provided with a notch 101 allowing the left supporting shaft 11 and/or the right supporting shaft 12 to penetrate through, and the stability of the internal structure is improved by means of such compact mounting structure.

The above embodiments are only the preferred embodiments of the present disclosure, and do not limit the scope of the patent of the present disclosure. Any equivalent structural transformation made under the inventive concept of the present disclosure by using the contents of the description and the accompanying drawings of the present disclosure, or direct/indirect application in other relevant technical fields, is included in the scope of protection of the patent of the present disclosure.

What is claimed is:

1. A hoverboard, comprising a left supporting shaft, a right supporting shaft and wheels, wherein an outer end of the left supporting shaft and an outer end of the right supporting shaft are both connected to the wheels; an inner end of the left supporting shaft and an inner end of the right supporting shaft are relatively rotatably connected to each other;

the inner end of the right supporting shaft is provided with a small outer-diameter portion which is adaptively inserted in the inner end of the left supporting shaft;

a side wall of the inner end of the left supporting shaft is provided with an arc-shaped through hole; a lower end of a limiting bolt penetrates through the arc-shaped through hole to be fixedly connected to the small outer-diameter portion, and an upper end of the limiting bolt is at least higher than a lower edge of the arc-shaped through hole; and two inner side walls of the arc-shaped through hole in a lengthwise direction thereof define extreme positions of the relative rotation of the left supporting shaft and the right supporting shaft respectively.

2. The hoverboard according to claim 1, wherein the arc-shaped through hole has a width matching that of an upper end cap of the limiting bolt, so that the upper end cap of the limiting bolt makes contact with side walls of the arc-shaped through hole.

3. The hoverboard according to claim 1, wherein the inner end of the left supporting shaft is provided with a mounting cylinder portion allowing the small outer-diameter portion to be inserted, and the mounting cylinder portion is provided with an inner wall surface perpendicular to the axis of the left supporting shaft, so as to define an extreme position of the small outer-diameter portion when the small outer-diameter portion is inserted into the left supporting shaft.

4. The hoverboard according to claim 3, further comprising a sleeve with two ends communicated with each other, wherein the sleeve is sleeved on the periphery of the small outer-diameter portion, and the sleeve and the small outer-diameter portion are coaxially mounted at the inner end of the left supporting shaft; and the sleeve is shorter than the small outer-diameter portion, and accordingly, the inner end of the left supporting shaft is provided with a large-diameter inner cylinder and a small-diameter inner cylinder which are sequentially distributed from left to right.

5. The hoverboard according to claim 1 or 4, further comprising a left cover and a right cover, wherein the left cover comprises an upper left cover and a lower left cover fitting the upper left cover, and a shaft lever of the left supporting shaft extends in a lengthwise direction of the left cover and is fixedly connected to the upper left cover; and the right cover comprises an upper right cover and a lower right cover fitting the upper right cover, and a shaft lever of the right supporting shaft extends in a lengthwise direction of the right cover and is fixedly connected to the upper right cover.

6. The hoverboard according to claim 5, further comprising a supporting sleeve, wherein the supporting sleeve comprises an inner supporting cylinder sleeved in a position where an inner end surface of the left supporting shaft and an inner end surface of the right supporting shaft converge; and an edge of the supporting sleeve is clamped in a position where a right end surface of the left cover and a left end surface of the right cover converge.

7. The hoverboard according to claim 6, wherein an end surface of the supporting sleeve is provided with U-shaped clamping corners extending horizontally outwards, openings of the U-shaped clamping corners face outwards, the left cover and/or the right cover are/is provided with supporting columns extending in a vertical direction, and the supporting columns are clamped in the openings of the U-shaped clamping corners.

8. The hoverboard according to claim 5, wherein mounting bases are respectively arranged in a supported manner between the shaft lever of the left supporting shaft and an inner end surface of the upper left cover and between the shaft lever of the right supporting shaft and an inner end surface of the upper right cover, and mounting bolts are respectively arranged to sequentially penetrate through the shaft lever of the left supporting shaft and the mounting base below and penetrate through the shaft lever of the right supporting shaft and the mounting base below to achieve fixed connection; and preferably, recesses which are sunken downwards and suitable for clamping of the shaft lever of the left supporting shaft and the shaft lever of the right supporting shaft are provided in upper end surfaces of the mounting bases.

9. The hoverboard according to claim 1, wherein the wheels comprise a left wheel and a right wheel, a wheel axle of the left wheel extending rightwards in a horizontal direction to form the left supporting shaft, and a wheel axle of the right wheel extending leftwards in a horizontal direction to form the right supporting shaft.

10. The hoverboard according to claim 1, wherein the wheel axle of the left wheel is inserted in the outer end of the left supporting shaft, and a fixing bolt radially penetrates through the wheel axle and the left supporting shaft to fixedly connect the wheel axle to the left supporting shaft; and similarly, the wheel axle of the right wheel is inserted in the outer end of the right supporting shaft, and a fixing bolt radially penetrates through the wheel axle and the right supporting shaft to fixedly connect the wheel axle to the right supporting shaft.

11. The hoverboard according to claim 10, wherein the wheel axles are fixedly connected to the left supporting shaft and/or the right supporting shaft by means of fixing assemblies;

each fixing assembly comprises a mounting sheet, supporting bases and the fixing bolt, the mounting sheet comprising an arc-shaped portion and platform portions, and the two platform portions being respectively connected to two free ends of the arc-shaped portion;

wire passing through holes are provided in a side wall of the outer end of the left supporting shaft and/or a side wall of the outer end of the right supporting shaft and are longer than shaft levers of the wheel axles that are inserted into the outer end of the left supporting shaft and/or the outer end of the right supporting shaft; and the arc-shaped portion is adaptively clamped on an outer side wall of the shaft lever of the left supporting shaft and/or an outer side wall of the shaft lever of the right supporting shaft, the fixing bolt sequentially penetrates through the arc-shaped portion, the wire passing through hole and the wheel axle to be fixedly connected to the wheel axle, the two platform portions are respectively located on two sides of the shaft lever of the left supporting shaft and/or two sides of the shaft lever of the right supporting shaft and are respectively carried by the two supporting bases, and the mounting bolts sequentially penetrate through the platform portions and the supporting bases to be fixedly connected to the supporting bases.

12. The hoverboard according to claim 9, wherein the wheel axles are fixedly connected to the left supporting shaft and/or the right supporting shaft by means of fixing assemblies;

fixing bolts sequentially penetrate through the side wall of the left supporting shaft and/or the side wall of the right supporting shaft and the wheel axles to be fixedly connected to the wheel axles;

arc-shaped portions are adaptively clamped on an outer side wall of a shaft lever of the left supporting shaft and/or an outer side wall of a shaft lever of the right supporting shaft, two platform portions are respectively located on two sides of the shaft lever of the left supporting shaft and/or two sides of the shaft lever of the right supporting shaft and are respectively carried by two supporting bases, and mounting bolts sequentially penetrate through the platform portions and the supporting bases to be fixedly connected to the supporting bases;

wire passing through holes are provided in a side wall of the outer end of the left supporting shaft and/or a side wall of the outer end of the right supporting shaft and are longer than shaft levers of the wheel axles that are inserted into the outer end of the left supporting shaft and/or the outer end of the right supporting shaft; and the wire passing through holes and the fixing bolts are located on two opposite sides of the supporting shaft levers.

13. The hoverboard according to claim 5, further comprising an infrared sensing assembly, wherein the infrared sensing assembly comprises pedal portions, arranged on the upper left cover and the upper right cover, and elastic components for supporting the pedal portions to reset, each pedal portion is provided with a fixing frame extending downwards, a sensing portion is connected to the fixing frame, an infrared sensing switch is arranged under the sensing portion, and the sensing portion can be inserted into the infrared sensing switch when the pedal portion is stressed to be pressed downwards; and when the pedal portion is reset upwards, the pedal portion is separated from the infrared sensing switch, and the infrared sensing switch is electrically connected to a control system of the hoverboard; and further comprising hub motors configured to drive the wheels and electrically connected to the control system.

14. The hoverboard according to claim 13, further comprising a power supply module for providing a power supply for the control system, wherein the power supply module is arranged in a battery box;

the battery box is mounted on the upper left cover and/or the upper right cover; and the middle of the battery box is provided with a notch allowing the left supporting shaft and/or the right supporting shaft to penetrate through.

* * * * *